Figure 1:
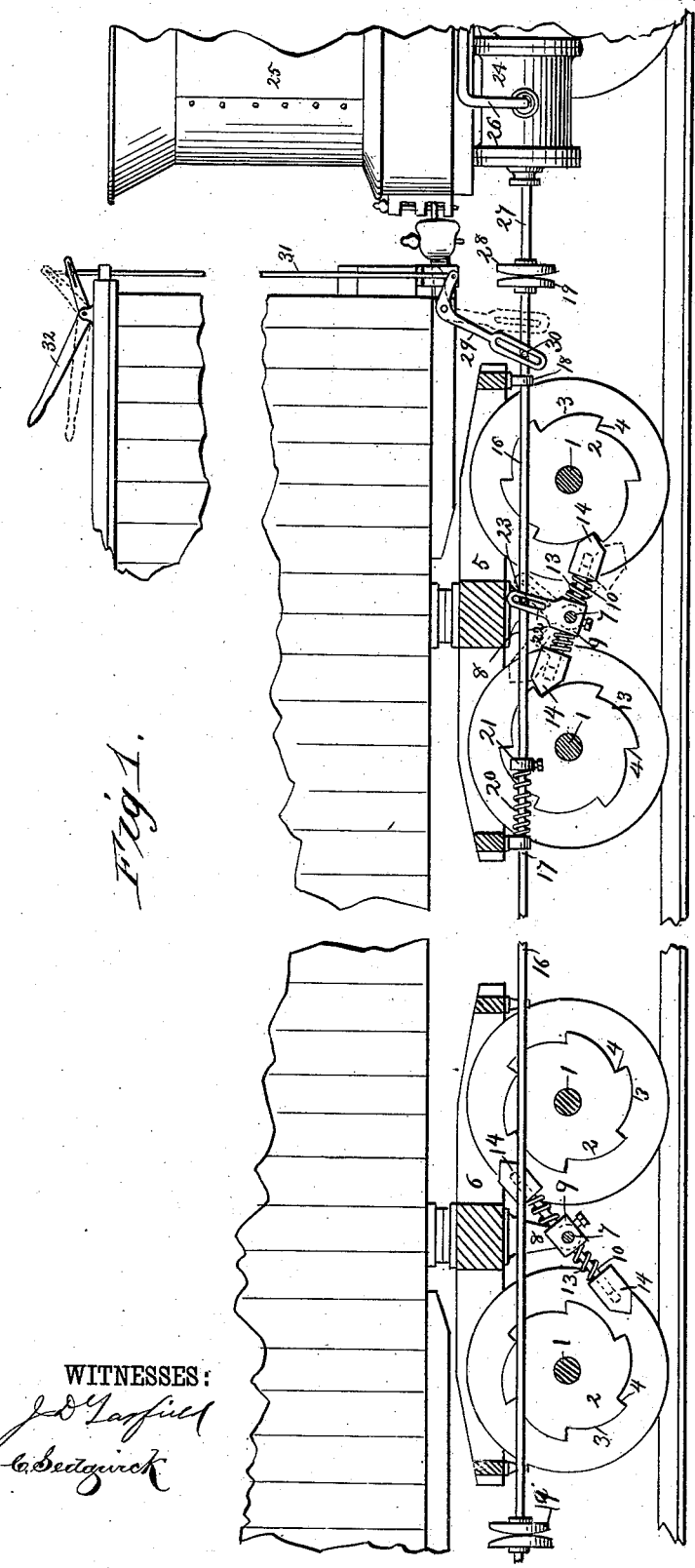

(No Model.) 2 Sheets—Sheet 1.

J. MORROW.
CAR BRAKE.

No. 351,519. Patented Oct. 26, 1886.

WITNESSES:

INVENTOR:
J. Morrow
BY Munn & Co.
ATTORNEYS.

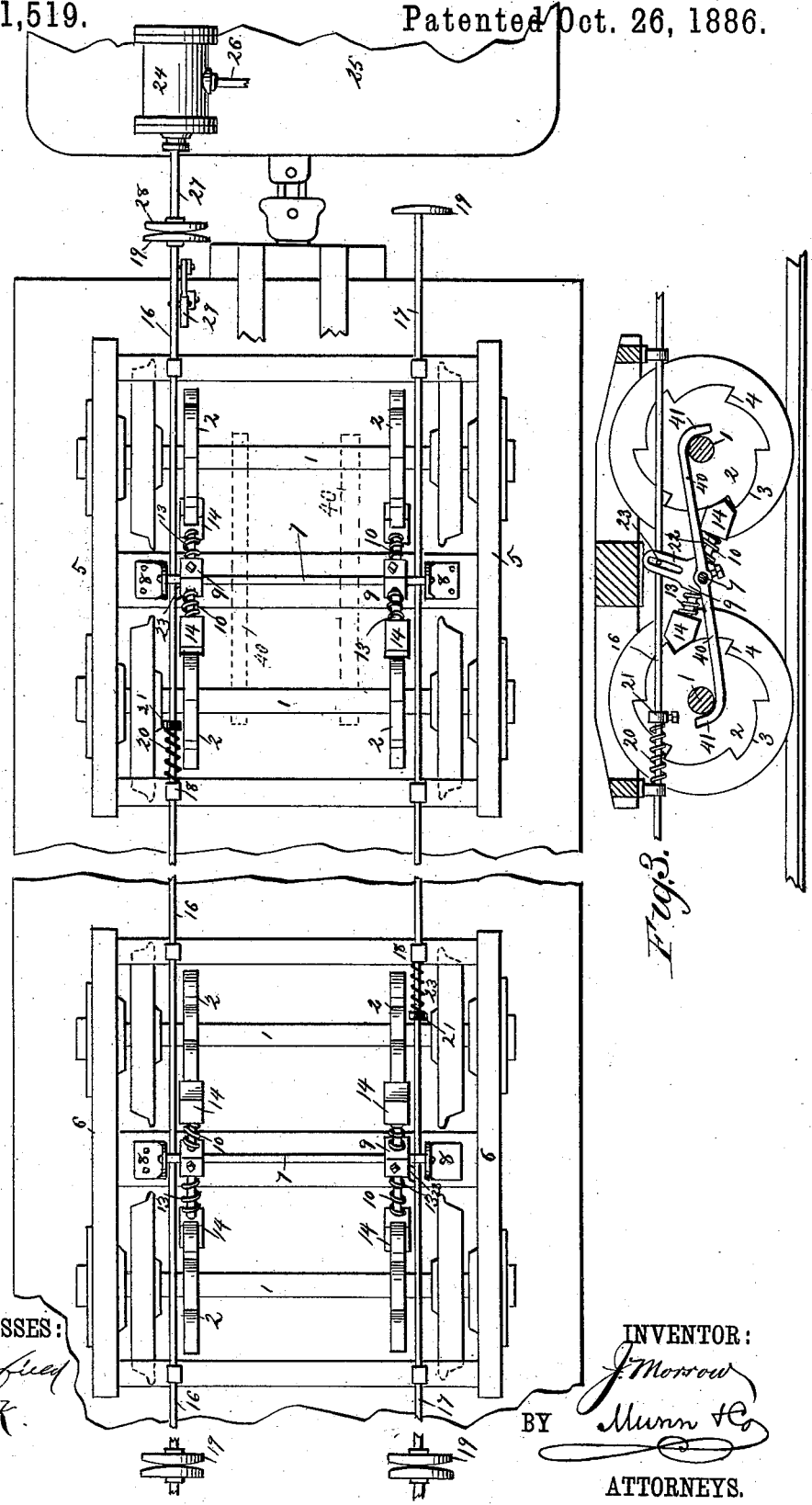

UNITED STATES PATENT OFFICE.

JOHN MORROW, OF PHILADELPHIA, PENNSYLVANIA.

CAR-BRAKE.

SPECIFICATION forming part of Letters Patent No. 351,519, dated October 26, 1886.

Application filed August 28, 1886. Serial No. 212,082. (No model.)

*To all whom it may concern:*

Be it known that I, JOHN MORROW, of Philadelphia, in the county of Philadelphia and State of Pennsylvania, have invented a new and Improved Car-Brake, of which the following is a full, clear, and exact description.

My invention relates to brakes for railway passenger-coaches and other forms of cars, and has for its object to provide an auxiliary brake, in connection with passenger-coaches, of simple construction, operated from the engine or end of the car to quickly stop a train moving at high speed, and as readily remove the brake therefrom, and wherein the same form of brake may be employed in connection with freight-cars for use as an ordinary brake.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1 is a longitudinal vertical section through the trucks of a car, having an engine attached thereto; and Fig. 2 is a bottom plan view of a car and attached engine with my brake applied thereto. Fig. 3 is a longitudinal vertical section through a truck, indicating the position of the axle-braces.

I aim to produce an efficient and quickly-applied brake of simple construction for use in connection with passenger-cars as an auxiliary brake adapted to stop a train suddenly in the event of a possible collision or other unforseen cause dangerous to a rapidly-moving train, the same brake when used in connection with freight-cars serving all the purposes of an ordinary brake, yet capable of instant application to thoroughly brake the train when moving at a high rate of speed. To this end I key or otherwise fasten to the axles 1 of the car, near the inner face of each wheel, a second wheel, 2, provided with a toothed periphery, the said teeth formed thereon with a long curved upper surface, 3, and a vertical face, 4, at right angles to said curved surface.

In fastening the toothed wheels 2 to the car-axles 1 they are so placed as that in the set provided for the truck 5, at one end of the car, the vertical faces 4 of the teeth integral with said wheels 2 will face in a direction the reverse of the vertical faces of the toothed wheels located upon the axles of the truck 6, at the other end of said car, for a purpose hereinafter stated.

Between the axles 1 of each truck 5 and 6 a transverse shaft, 7, is held to turn in hangers 8, attached to the car-trucks in any suitable manner.

Blocks 9, provided with arms 10, extending outwardly therefrom in opposite directions in the same plane, are secured upon the shaft 7 by a set-screw or otherwise, one at each side of the forward and rear trucks, 5 and 6, in line with the toothed wheels 2. The said projecting arms 10 are encircled by a spiral or coiled spring, 13, bearing at one end upon the side of the said blocks 9 and at the other upon the under side of angular-faced brake-shoes 14, held to slide a limited distance upon the aforesaid projecting arms 10.

The object of the springs 13, encircling the projecting arms 10, and the limited play of the brake-shoes 14 upon said arms is to relieve the said shoes and arms from the sudden shock brought to bear upon them when the simultaneous engagement of the brake-shoes at each end of the brake is made with the teeth of the wheels 2, between which the said brake is centered, to brake a train, as will be hereinafter fully set forth.

The brake-blocks 9, with their connected arms and shoes held beneath the truck 5, are inclined at an angle the reverse of those suspended beneath the truck 6, due to the opposite arrangement of the toothed wheels of the two trucks.

Each set of brakes operates independently. For example, when the engine is coupled to the car at the end supported by truck 5, the brakes attached to that truck only are employed, the brakes used in connection with the rear truck, 6, not operating, and vice versa.

Rods 16 and 17 are supported beneath the car, one at each side thereof, between the car-wheels and the attached toothed wheels 2, in suitable eyes, 18, secured to the transverse beams of trucks 5 and 6. The ends of the rods 16 and 17, which slightly project beyond the front and rear sills of the car, are provided with buffers 19, attached thereto, and coiled or spiral springs 20, made to encircle the said rods, are held in position thereon by collars 21, provided with suitable set-screws to bear against the aforesaid eyes 18. The spring on the rod 16 is held against an eye secured in the rear transverse beam of truck 5 when the train is coupled, as shown in the drawings, while the spring on the rod 17 is held to bear against an eye affixed to the forward transverse beam of truck 6, or upon the opposite side to rod 16, as illustrated in Fig. 2.

One brake-block, 9, suspended from each truck 5 and beneath the rods 16 and 17, upon opposite sides of the car, is provided with an integral perpendicular slotted projection, 22, adapted to engage pins 23, secured upon said rods 16 and 17, and be operated thereby. When the rods are in their normal position, the united brake-blocks and their attached arms and shoes are held at an angle over one toothed wheel, 2, and below the opposite toothed wheel of the same truck, and upon the same side, as shown in dotted lines, trucks 5, of Fig. 1, and in positive lines, same figure, truck 6.

The longitudinal brake-rods 16 and 17 are adapted to be operated through the medium of a steam-cylinder, 24, located under the tender 25 of an engine, to the rear at one side thereof, and to which the steam is supplied from the boiler by a pipe, 26. The piston-rod 27, made to slide within the cylinder 24, is provided at its outer end with a buffer, 28, of the same pattern used in connection with the rods 16 and 17, and at its inner end with the usual piston-head, together with a spring between said piston-head and the end of the cylinder, (the spring not shown,) to return said piston-rod to its normal position within said cylinder after the brake has been applied thereby. The spring thus applied obviates the necessity of introducing steam upon both sides of the piston-head.

In the operation of my car-brake, with the train positioned as shown, the steam is turned into the cylinder 24, the piston rod 27 is forced out thereby, and the buffer 28 thereon engages with the buffer 19 of the rod 16, which in turn communicates the motion to the next car, and so on throughout the train. This rearward movement of the rod 16 carries the pin 23 thereon to a more central position between the wheels, causing the brake-blocks of the forward truck, 5, of each car to assume a more horizontal position, whereby the pointed-faced brake-shoes 14 are instantly brought in contact with the toothed wheels 2, between which they were suspended, the engagement being made at the angle of the teeth, as shown in Fig. 1, thereby almost instantly stopping the train. The sudden shock of this applied brake is somewhat relieved by the wheels of the rear trucks, 6, which are left free to revolve, the brake only being applied to the forward trucks, 5. When the steam is cut off from the cylinder, and the piston-rod, by the means herein-before described, drawn back, the rods 16, thus relieved, are returned to their normal position through the springs 20, mounted thereon. While in passenger-coaches my brake is intended for use as an auxiliary safety attachment, in freight cars it is capable of general use, and no other brake need be employed.

The brake can be operated at the top of a car or on the platform thereof by means of a slotted angular lever, 29, pivoted to the sill, adapted to engage a pin, 30, attached to the rod 16, as shown in Fig. 1, and a vertical rod, 31, attached to the said lever 29, is carried to the roof of the car or rail of the platform and operated by a second angular lever, 32, attached thereto. Thus my brake is operated equally as quickly and effectually from the top or end of a car as from the engine.

In order to prevent the axles 1 from bending under the strain brought to bear upon them by the sudden engagement of the brakes with the toothed wheels 2, keyed upon said axles, I secure upon the transverse rods 7, intervening the axles, two longitudinal bars, 40, one near each toothed wheel 2. The longitudinal bars, which are attached to said transverse rods 7 in an approved manner, are provided with ends 41, bent at right angles thereto in opposite directions, the said ends being adapted to engage one axle of a truck from beneath upward and the other, the opposite axle, from above downward, as shown in dotted lines Fig. 2, and in positive lines Fig. 3. The axles are thus kept in line and effectually prevented from bending under the force exerted against them in braking the train.

Having thus described my invention, what I claim as new, and desire to secure by Letters Patent, is—

1. The combination, with the axles of a car having toothed wheels 2 secured thereon, of brake-blocks 9, provided with arms 10, springs 13, and brake-shoes 14, attached to transverse shafts 7, supported in hangers 8 beneath the car, together with means for operating said brake-blocks, substantially as shown and described, and for the purpose herein set forth.

2. The combination, with a longitudinal brake-rod, 16, provided with buffers 19 and pin 23, of brake-blocks 9, provided with arms 10, springs 13, and brake-shoes 14, fastened to the same shaft and supported beneath the forward truck, the one block 9 in line with the rod 16, provided also with a slotted projection, 22, adapted to engage the pin 23 on said rod, together with means for operating the brake rod and blocks, substantially as shown and described, and for the purpose herein set forth.

3. The combination, with the steam-cylinder 24, provided with steam-pipe 26, and piston-rod 27, having attached thereto a buffer, 28, of the brake-rod 16, provided with buffers 19 and a pin, 23, the brake-blocks 9 of the forward truck, 5, carrying arms 10, springs 13, and brake-shoes 14, the block in line with said rod, having also a slotted projection, 22, together with the shaft 7 and hangers 8, substantially as shown and described, and for the purpose herein set forth.

4. In a car-brake, the combination, with the front and rear trucks having toothed wheels 2 secured to the axles thereof, of brake-blocks 9, provided with arms 10, springs 13, and brake-shoes 14, suspended beneath said trucks at opposite angles and operated in reverse directions, as herein described, whereby the brakes of the rear truck remain inactive when those of the forward truck are applied, substantially as shown and described, and for the purpose set forth.

5. A brake block and shoe consisting of the block 9, provided with arms 10, projecting therefrom upon two sides in the same plane, and a spring, 13, encircling said arms, together with brake-shoes 14, provided with angular faces adapted to slide upon said arms 10, substantially as shown and described, and for the purpose herein set forth.

6. In a car-brake, the combination, with a steam-cylinder, 24, provided with steam-inlet pipe 26, and a piston-rod, 27, having attached thereto a buffer, 28, of the longitudinal brake-rod 16, supported beneath the forward and rear trucks by eyes 18, and provided with a spring, 20, and collar 21, substantially as shown and described, and for the purpose herein set forth.

7. In a car-brake, the combination, with the car-axles 1, carrying toothed wheels 2, of the shaft 7, carrying brake-blocks 9, supporting-shoes 14, and bars 40, having oppositely-bent ends 41, substantially as shown and described.

8. A car-brake consisting of a longitudinal rod, 16, suspended beneath the car, provided with a spring, 20, collar 21, and pin 23, a shaft, 7, supported in hangers beneath the forward truck, 5, carrying brake-blocks 9, provided with arms 10, springs 13, and brake-shoes 14, the block 9, in line with said rod, provided with a slotted projection, 22, together with a duplicate construction for the rear truck, 6, operated from the reverse side in an opposite direction, whereby the one set of brakes remain inactive when the other is employed, substantially as shown and described, and for the purpose herein set forth.

JOHN MORROW.

Witnesses:
DAN. SHERK,
JOHN C. GALLEN.